RADIO RECEIVER
Filed Sept. 18, 1945
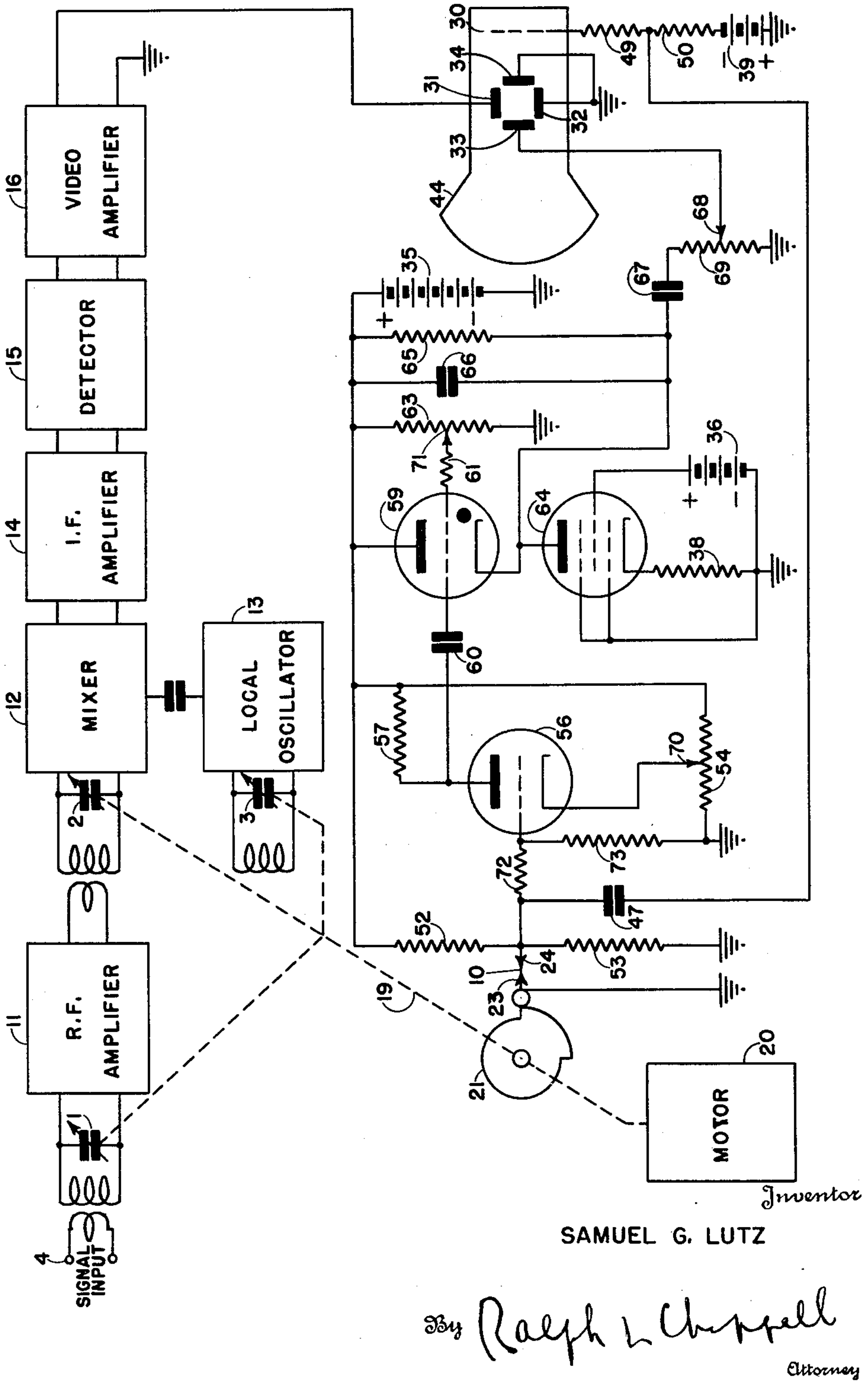
Inventor
SAMUEL G. LUTZ
By Ralph L. Chappell
Attorney United States Patent Office 2,706,777

Patented Apr. 19, 1955

2,706,777

RADIO RECEIVER

Samuel G. Lutz, Washington, D. C.

Application September 18, 1945, Serial No. 617,158

1 Claim. (Cl. 250—20)

(Granted under Title 35, U. S. Code (1952), sec. 266)

This invention relates to panoramic radio receivers and is particularly directed to providing a sweep circuit for the oscilloscope in panoramic receivers using mechanical scanning.

Panoramic receivers are tuned mechanically or electrically to sweep periodically over a band of frequencies. It is customary to synchronize an oscilloscope with the tuning apparatus to cause the oscilloscope beam to sweep across its screen as the receiver tunes through the frequency band. Signals intercepted by the receiver are detected and caused to deflect the beam at right angles to the direction of sweep. Consequently the oscilloscope shows any signals received as pips on the trace. The face of the tube may be so calibrated that the frequencies of intercepted signals can be read directly from the screen.

The panoramic receivers to which this invention is applicable are tuned by high speed rotation of the tuning condensers. This method of tuning is simple and stable. When this mechanical tuning technique is employed in a panoramic receiver, a suitable sweep voltage for the oscilloscope must be generated and synchronized with the high-speed rotating tuning system. Preexisting panoramic receivers have employed for this purpose the voltage across a condenser which was charged and discharged through resistors switched in and out by a cam-operated switch. The results obtained have been faulty in two respects; first, the sweep voltage obtained has been appreciably non-linear, making accurate calibration difficult, and, second, the visible retrace or evidence on the oscilloscope screen of the beam's return to its starting position was a source of great confusion, in many cases even obscuring weak signal pips.

It is therefore the object of this invention to provide a sweep circuit for the oscilloscope in a panoramic receiver which will produce a linear sweep voltage for beam deflection and suppress the return trace.

The invention will be described in detail with reference to the appended drawing, which illustrates in schematic and block form a panoramic receiver embodying the invention.

Referring to the drawing, those components of the receiver which may be conventional are shown in block form. Signals are fed from input terminals 4 to radio frequency amplifier 11, which is tuned by variable condenser 1. The signal voltage as amplified is then fed into mixer stage 12, which is tuned by variable condenser 2. Also feeding into mixer stage 12 is voltage from local oscillator 13, tuned by variable condenser 3. The output of mixer 12, being signal voltage after conversion to the intermediate frequency, is fed to I. F. amplifier 14 from which it goes to detector 15. The video voltage at the output of detector 15 is amplified in video amplifier 16. Cathode ray tube 44 is represented schematically; only its beam deflection plates 31, 32, 33, and 34, and its intensity control grid 30 are shown in the drawing. Voltage applied to plates 31 and 32 causes vertical deflection of the electron beam; voltage applied to plates 33 and 34 produces horizontal deflection. Plates 32 and 34 and one output terminal of video amplifier 16 are grounded; the ungrounded output terminal of video amplifier 16 is connected to plate 31. Systematic horizontal deflection or "sweep" of the beam is accomplished by the portion of the receiver comprising the invention now to be described.

The rotor sections of variable condensers 1, 2, and 3, together with cam 21, are ganged together on a common shaft 19 and are rotated in unison at high speed by motor

20. A cam-operated switch 10 having contacts 23 and 24 is so constructed that it is normally open, but is closed when engaged by the cam. Cam 21 is so shaped and oriented relative to the condenser rotors that when the condensers are increasing in capacitance, switch 10 is open, but when they are decreasing in capacitance, the switch is closed. The condensers employed in the embodiment shown in the drawing are so designed that when the rotors are rotated by motor 20, the condensers increase in capacitance during 270° of rotation and decrease in capacitance during the remaining 90° of rotation.

Switch contact 23 is grounded; contact 24 is connected to the junction of resistors 52 and 53, which are connected in series between the positive side of D.-C. source 35 and ground. The negative side of D.-C. source 35 is grounded. Contact 24 is also connected through resistor 72 to the grid of triode tube 56. The grid of tube 56 is returned to ground through resistor 73. Potentiometer 54 is connected between the positive side of D.-C. source 35 and ground, and the cathode of tube 56 is connected to movable tap 70 on potentiometer 54. The plate of tube 56 is connected through load resistor 57 to the positive side of D.-C. source 35.

Tube 59 is a grid-controlled gas tube; its plate is connected to the positive side of source 35; its cathode is connected to the plate of pentode tube 64. The grid of gas tube 59 is connected, through resistor 61, to movable tap 71 on potentiometer 63. Potentiometer 63 is connected between the positive side of source 35 and ground. The grid of gas tube 59 is also coupled to the plate of tube 56 through condenser 60.

The plate of pentode tube 64 is connected to the positive side of source 35 through the parallel combination of condenser 66 and resistor 65; its suppressor and control grids are grounded; and its cathode is connected to ground through resistor 38. The screen grid of pentode tube 64 is connected to the positive side of D.-C. source 36; the negative side of source 36 is grounded.

The plate of pentode tube 64 is coupled to deflection plate 33 of cathode ray tube 44. The coupling is accomplished by the RC circuit comprising condenser 67 and potentiometer 69 connected in series between the plate of tube 64 and ground. Deflection plate 33 is connected to tap 68 on potentiometer 69; the magnitude of horizontal deflection voltage fed to plate 33 may be controlled by varying the position of tap 68.

Intensity control grid 30 of cathode ray tube 44 is connected through resistors 49 and 50 in series to the negative side of D.-C. biasing source 39. The positive side of source 39 is grounded. The potential variations appearing at switch contact 24 are coupled through condenser 47 to the junction of resistors 49 and 50.

In operation, tap 70 on potentiometer 54 is set to a voltage approximately equal to the grid voltage of tube 56 when switch 10 is open. Tap 71 on potentiometer 63 is set to a voltage substantially more negative than the quiescent cathode potential of gas tube 59, so that gas tube 59 is normally non-conducting. Now assume the receiver has been set into operation and motor 20 is rotating the condenser rotors and cam 21. When cam 21 closes switch 10, contact 24 is suddenly placed at ground potential. Condenser 47 has on it a charge equal to the difference between the average potential at contact 24 and the average potential at the junction of the resistors 49 and 50. The time constant of condenser 47 and its associated resistances is very long relative to the period of rotation of cam 21, so that its charge cannot change appreciably during one rotation of the cam. Therefore, when cam 21 causes contact 24 to be shorted to ground the potential appearing at the junction of resistances 52 and 53 drops immediately to ground, and the intensity control grid 30 of cathode ray tube 44 is accordingly driven through condenser 47 to a much more negative potential than normally and is held there so long as cam 21 keeps switch 10 closed. The high negative potential applied to grid 30 cuts off the beam in cathode ray tube 44 so long as it continues, thereby blanking the oscilloscope screen during the retrace of the beam, which coincides in time with the shift from maximum to minimum capacitance of condensers 1, 2 and 3. When the condensers 1, 2, and 3 pass their minimum capacitance position and begin to increase in capacitance again, the cam-operated switch 10 opens, the potential on the intensity control grid 30 is restored to its normal bias value, and the oscillosocpe beam is turned on again.

At the same instant that the grounding of contact 24 blanks out the beam, tube 56 ceases to pass plate current, since its grid is suddenly placed at ground potential, many volts more negative than its cathode. In consequence its plate voltage rises sharply carrying along with it the grid voltage of gas tube 59. When the grid of tube 59 rises above a critical potential, the gas in tube 59 ionizes and the tube becomes in effect a very low resistance. Condenser 66, which is shunted by gas tube 59, thereupon rapidly discharges until the voltage across it, and its parallel resistor 65, is barely sufficient to maintain ionization in gas tube 59. When, at the conclusion of the blanking interval, switch 10 opens, the grid of tube 56 returns to its normal potential, tube 56 again conducts and its plate voltage drops sharply. This drop in potential is transmitted through condenser 60 to the grid of gas tube 59. Because tube 59 is at this time passing barely enough current to maintain ionization, the grid has control and the negative voltage shift on the grid cuts off gas tube 59 entirely.

At this point, condenser 66 begins to charge from D.-C. source 35 through pentode tube 64. Because of the constant current characteristic of the pentode tube, the charging current flowing into condenser 66 is almost perfectly constant; as a result, the voltage across condenser 66 increases linearly with time. The plate voltage of pentode tube 64, being equal to the constant supply voltage from source 35 minus the voltage across condenser 66, therefore drops as a linear function of time. When another blanking interval occurs, gas tube 59 is caused to conduct again, discharging condenser 66 and raising the plate voltage of the pentode 64 to its maximum value. This cycle is repeated with each rotation of cam 21. The plate voltage of pentode tube 64 thus assumes a sawtooth waveform, falling linearly during the intervals in which the oscilloscope beam is on, and returning abruptly to its maximum value when the beam is blanked out. The plate voltage of pentode 64 is coupled by the RC network 67, 69 to the ungrounded horizontal deflection plate of cathode ray tube 44, providing for that tube a linear sweep voltage perfectly synchronized with the portion of the condenser rotation cycle wherein the receiver is sweeping over the frequency band from maximum to minimum frequency. This sawtooth voltage causes the beam to appear at the left side of the oscilloscope screen at the beginning of each frequency sweep and move across the screen to the right at a constant velocity during the sweep. At the instant that the variable condensers reach maximum capacitance, the beam is suppressed and the sweep voltage is returned to its initial value so that when the beam is turned on again, at the beginning of the next frequency sweep, it appears on the left side of the screen as before and starts a new sweep cycle. The amplitude of the voltage fed to the oscilloscope plate 33 can be set with potentiometer 69 to the value which gives the trace the desired horizontal excursion.

Video impulses resulting from signals intercepted by the receiver during its frequency sweep, being fed to the oscilloscope plates causing vertical deflection, appear on the screen as vertical pips on the horizontal time base, distributed across the screen according to their respective frequencies.

It will be understood that the embodiment of the invention herein shown and described is exemplary only and that the scope of the invention is to be determined from the appended claim.

The invention described herein may be manufactured and used by or for the Government of the United States of America for governmental purposes without the payment of any royalties thereon or therefor.

What is claimed is:

In a panoramic reception system, a radio receiver having tuning means operable by rotation to shift the response of the receiver over a band of frequencies; motor means mechanically coupled to the tuning means operative continuously to rotate the same; a single cam operated switch means driven by the motor means having a first state when the tuning means is shifting the receiver response in one direction within the band of frequencies and a second state when the tuning means is shifting the receiver response in the opposite direction within the band of frequencies; a cathode ray tube having an electron beam, intensity control means, and horizontal and vertical deflection plates; means coupled to the switch means operative to produce a rectangular voltage wave having one polarity when the switch means is in the first state and opposite polarity when the switch means is in the second state; means applying the rectangular voltage wave to the intensity control means operative to suppress the electron beam when the switch means is in the first state; a condenser, a constant-current impedance, and power supply means connected in series; a gas tube connected across the condenser, means applying said rectangular voltage wave to said gas tube to discharge the condenser when the switch means is in the first state and to allow the condenser to charge uniformly through said constant impedance device when the switch means is in the second state, producing thereby a sawtooth voltage of one sense, across the condenser; and a sawtooth voltage of the opposite sense across the constant current impedance device, means applying one of the sawtooth voltages to the horizontal deflection plates; and means coupling the receiver to the vertical plates.

References Cited in the file of this patent

UNITED STATES PATENTS

| | | |
|---|---|---|
| 2,266,516 | Russell | Dec. 16, 1941 |
| 2,367,907 | Wallace | Jan. 23, 1945 |
| 2,378,604 | Wallace | June 19, 1945 |
| 2,400,813 | Dodds | May 21, 1946 |
| 2,412,991 | Labin | Dec. 24, 1946 |
| 2,450,018 | Preisman | Sept. 28, 1948 |
| 2,502,294 | Wallace | Mar. 28, 1950 |
| 2,520,138 | Frink | Aug. 29, 1950 |